Jan. 22, 1924.  1,481,384
E. NEY
COFFEE URN
Filed Aug. 1, 1923
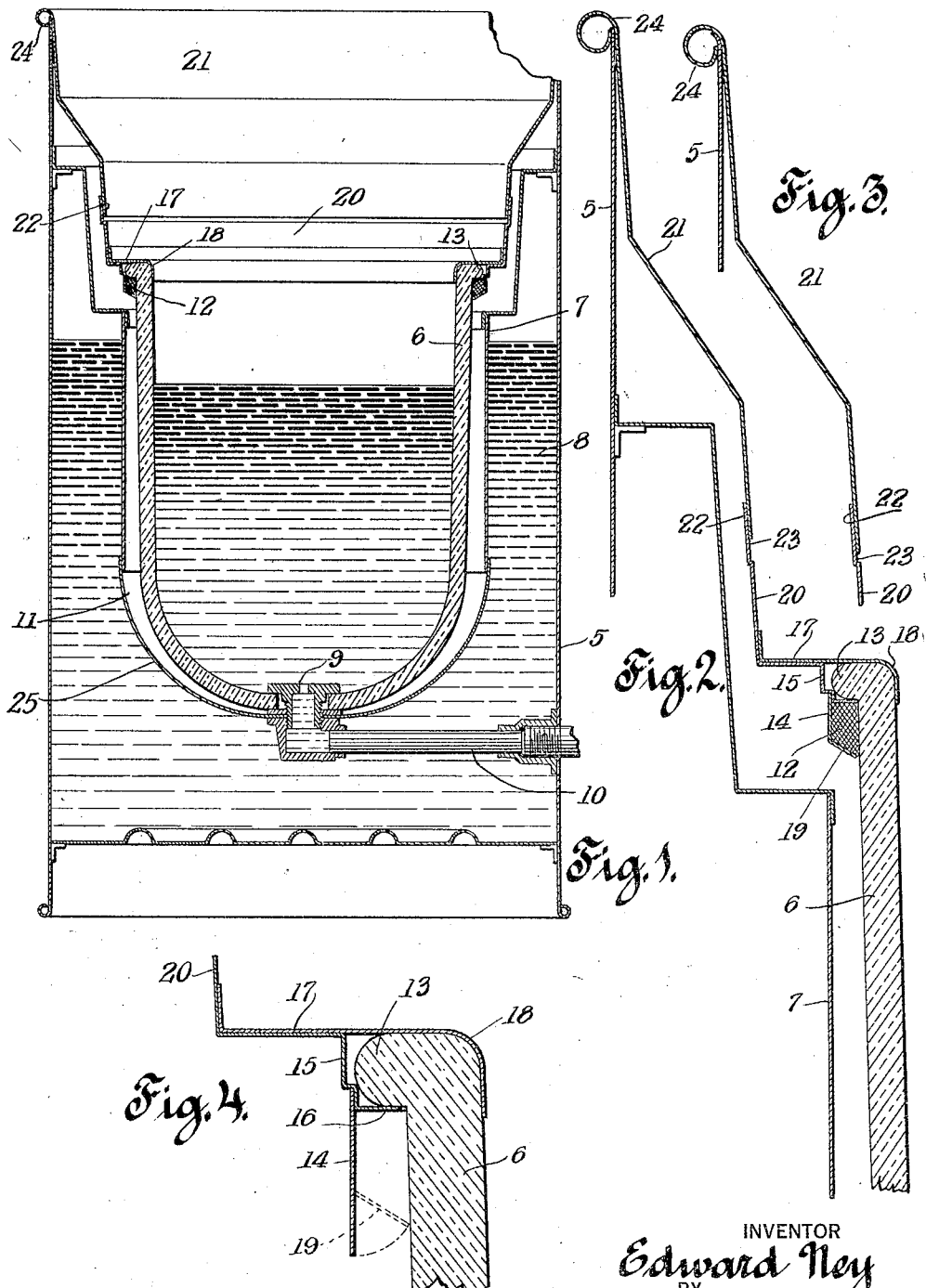
INVENTOR
Edward Ney
BY
Philip S. McLean, ATTORNEY Patented Jan. 22, 1924.

1,481,384

UNITED STATES PATENT OFFICE.

EDWARD NEY, OF NEW YORK, N. Y.

COFFEE URN.

Application filed August 1, 1923. Serial No. 654,971.

*To all whom it may concern:*

Be it known that I, EDWARD NEY, a citizen of the United States, and a resident of New York, county and State of New York, have invented certain new and useful Improvements in Coffee Urns, of which the following is a specification.

This invention relates particularly to large size urns of the type in which the coffee or other liquid is contained in a jar of glazed pottery or the like. Because of shrinkage and other defects these jars vary considerably in size and shape, making it difficult to fit them to the metallic parts of the urn and to prevent leakage.

The objects of the invention are to facilitate the mounting and connecting of the jars in the body of the urns and provide simple, practical means for compensating for variations in the sizes and shapes of the urns.

The foregoing and other desired objects are attained in this invention through certain novel features of construction, combination and relation of parts as disclosed in the following specification and illustrated in the accompanying drawing, in which:

Figure 1 is a vertical sectional view of a coffee urn constructed in accordance with and embodying features of the invention.

Figure 2 is a detail sectional view illustrating on an enlarged scale the adjustable joints between the jar, the inner vessel and the "cylinder" or outer case.

Figure 3 is a fragmentary section illustrating further the method of providing for adjustments between the inner vessel and the outer case.

Figure 4 is a further enlarged fragmentary section illustrating the manner of securing the packing about the rim of the jar.

In the illustrated embodiment of the invention the outer case or shell of the urn is designated 5 and the jar is indicated at 6. A partition 7 provides an annular water chamber 8 within the shell of the urn and the jar is seated within the central cavity formed by this partition so as to take up the heat of the water chamber. An outlet for the coffee is provided in the body of the jar at 9, extended by suitable piping 10 out through the side of the casing.

To prevent the coffee from boiling over the edge of the jar into the space 11 surrounding the jar, a special packing is provided about the mouth of the jar, embodying a body of packing material 12 held confined beneath the outstanding bead 13 of the jar by a confining flange 14. This flange is secured in dependent fashion to a ring member 15 embracing the rim of the jar and having a flange 16 caught under the bead of the jar. The ring 15 is secured in this surrounding relation by a ring member 17 fitting within the same and having an inwardly extended and downwardly directed portion 18 fitting over and into the mouth of the jar.

The usual method of assembling and securing these parts to the jar is to bring the outer ring 15 up over the outside of the jar into engagement with the bead at the rim of the same, then to force the inner ring 17 inside the outer ring and to its seat in the mouth of the jar after which these parts may be secured together at their meeting surface by means of solder or the like.

With the packing flange 14 in its fully dependent condition, as illustrated in the full lines in Figure 4, the packing material may be engaged beneath the same in the form of a gasket, after which the lower end of this flange may be turned inwardly, as indicated at 19, to serve as a retainer. A preferred method is to pack the gasket in a wet condition so that it will expand with the heat and become firmly secured, sealed in tight engagement with the rim of the jar.

With the construction described the gasket is permanently secured to the jar and the ring structure is sealed to the mouth of the jar in such a way as to constitute an extension or upward continuation of the same. Consequently, even if the liquid in the jar should rise over the top of the jar there can be no leakage over into the surrounding heating compartment.

The upstanding flange 20 carried by the ring 15 and forming in effect a metallic extension of the jar constitutes one member of a telescopic joint by which an adjustable connection is made with the shell of the urn. The other member of this telescopic joint is the collar 21 which is shown as having a tapered lower end slidingly fitting at 22 within the correspondingly tapered and outwardly offset throat portion 23 of the upstanding flange 20. This telescopic connection allows for considerable latitude in the height of the jars and once the jar is in place and the necessary adjustment is effected, the joint may be sealed as by soldering or the like.

The funnel shaped collar 21 is connected with the casing in such a way as to allow for the telescopic adjustment just described. In the illustration this adjustable connection is effected by providing the collar with an outwardly turned bead 24 about the upper edge of the same which is open below, as shown in Figures 1, 2 and 3, sufficiently to slidingly receive the upper edge of the casing. Figures 2 and 3 show how the open bead can be forced down over the edge of the casing to any desired extent to allow for the necessary amount of overlap at 22.

The bottom of the chamber in which the jar is seated is shown as substantially hemispherical in form so as to reduce the space between the rounded bottom of the jar and the surrounding body of heating water. In practice, this hemispherical portion 25 is usually made of a single piece of metal "spun" into this shape and secured at its upper edges to the lower end of the cylindrical or annular partition wall 7. In addition to bringing the heating element in closer relation to the bottom of the jar this construction eliminates objectionable corners.

It will be seen that with this invention the variations in size of the pottery jars are readily compensated for in simple, practical manner and a permanent tight seal is effected between the upper edge of the jar and the metallic parts which constitute in effect the continuation of the jar.

The invention furthermore provides a wholly sanitary structure which can be easily cleaned. The parts can be quickly adjusted and assembled in final relation, or, in case of necessary repairs, can be quickly taken apart.

The ring of sealing material reinforces the rim of the jar and provides a wide, firm support for the same and one which, by reason of its yielding character, acts as a cushion to absorb blows or knocks which otherwise might break the jar, as well as to compensate for variable expansion and contraction of the jar and the connecting metallic structure.

To allow full freedom of expansion of the jar, the inwardly extending flange 16, which is engaged beneath the bead of the jar, need not extend clear in to the wall of the jar, as indicated in figure 4, so as to leave an annular clearance space at this point. This is important in preventing breaking and cracking of the more or less fragile jar, particularly in cases of overheating the same.

What I claim is:

1. In an urn of the character disclosed, a jar having a bead at the mouth of the same, an annular extension and support applied to the mouth of the jar and a yielding packing held by said extension in position surrounding the jar beneath the bead and thereby providing a yielding reinforcement strengthening and supporting the jar and a seal between the jar and its extension.

2. In an urn of the character disclosed, a jar having a bead at the mouth of the same, an annular extension forming a continuation of the jar and permanently secured over the bead, said permanently secured extension having an annular pocket about the wall of the jar and a body of packing material seated in said pocket in sealing engagement with the surface of the jar.

3. A structure as in claim 2 in which the pocket is provided by a flange having a deformable portion bent over the packing to permanently hold the same in place.

4. In an urn of the character disclosed, a jar having a bead about the rim thereof, cooperating annular members engaged over said bead and thereby held to the jar, the outer of such members having a dependent flange and packing material held by said flange in sealing engagement with the outer surface of the jar.

5. In an urn of the character disclosed, a jar, an extension of the same having a sealed connection with the jar, a casing and an annular member forming a connection between the jar extension and casing and having a telescopic joint with said extension.

6. A structure as in claim 5 in which the annular member further has an oversliding joint with the casing.

7. A coffee urn comprising a casing, an annular connecting member having an outwardly rolled bead open to adjustably fit over the edge of the casing, a jar within the casing having a bead about the upper edge of the same, an upstanding annular flange engaged beneath the body of the jar at its lower end and having an oversliding engagement at its upper end with the connecting member, a ring engaged over the inside of the rim of the jar and secured to the outer upstanding flange member, a flange dependent from said outer member and spaced from the jar to provide an annular pocket thereabout and packing material seated in said annular pocket, said flange having an inwardly directed portion holding the packing sealed in engagement with the surface of the jar.

8. In an urn of the character disclosed, a jar, an annular extension permanently secured in sealing engagement with the mouth of the jar and an annular casing member having an adjustable engagement with said permanently secured jar member.

9. In a coffee urn or the like, a casing, a jar mounted therein and connecting means between the casing and the mouth of the jar having an oversliding, tapered, telescopic joint.

In witness whereof, I have hereunto set my hand this 27th day of July, 1923.

EDWARD NEY.